(12) United States Patent
Ogiwara

(10) Patent No.: US 11,274,794 B2
(45) Date of Patent: Mar. 15, 2022

(54) METHOD OF FILLING FUEL GAS

(71) Applicant: HONDA MOTOR CO., LTD., Tokyo (JP)

(72) Inventor: Naoki Ogiwara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 16/751,822

(22) Filed: Jan. 24, 2020

(65) Prior Publication Data
US 2020/0240587 A1 Jul. 30, 2020

(30) Foreign Application Priority Data
Jan. 25, 2019 (JP) .............................. JP2019-010927

(51) Int. Cl.
| | | |
|---|---|---|
| *H01M 8/04082* | (2016.01) | |
| *F17C 5/06* | (2006.01) | |
| *F17C 5/00* | (2006.01) | |
| *B60L 50/72* | (2019.01) | |

(52) U.S. Cl.
CPC .............. *F17C 5/007* (2013.01); *B60L 50/72* (2019.02); *F17C 5/06* (2013.01); *H01M 8/04201* (2013.01); *F17C 2201/0109* (2013.01); *F17C 2203/0619* (2013.01); *F17C 2203/0658* (2013.01); *F17C 2221/012* (2013.01); *F17C 2250/043* (2013.01); *F17C 2250/0443* (2013.01); *F17C 2250/0473* (2013.01); *F17C 2270/0178* (2013.01); *F17C 2270/0184* (2013.01); *H01M 2250/20* (2013.01)

(58) Field of Classification Search
CPC .... F17C 5/007; F17C 5/06; F17C 2201/0109; F17C 2203/0619; F17C 2203/0658; F17C 2221/012; F17C 2250/043; F17C 2250/0443; F17C 2250/0473; F17C 2270/0178; F17C 2270/0184; B60L 50/72; H01M 8/04201; H01M 2250/20
See application file for complete search history.

(56) References Cited

U.S. PATENT DOCUMENTS

| | | | | |
|---|---|---|---|---|
| 2010/0072209 A1* | 3/2010 | Hatta | ........................ | F17C 1/16 |
| | | | | 220/586 |
| 2012/0291878 A1* | 11/2012 | Pisot | ........................ | F17C 1/06 |
| | | | | 137/315.01 |

FOREIGN PATENT DOCUMENTS

JP 2009-243675 A 10/2009

* cited by examiner

*Primary Examiner* — Jason K Niesz
(74) *Attorney, Agent, or Firm* — Carrier Blackman & Associates, P.C.; Joseph P. Carrier; William D. Blackman

(57) ABSTRACT

Decrease speed (gas pressure decrease speed) of fuel gas pressure in an in-vehicle fuel gas container and elapsed time after the fuel gas pressure reaches a predetermined lower limit value are measured. Then, based on the gas pressure decrease speed and the elapsed time, it is determined whether or not a burping occurrence condition where a fuel gas which entered space between an inner layer and an outer layer of the in-vehicle fuel gas container is discharged to the outside of the outer layer is satisfied. If the burping occurrence condition is satisfied, at the time of filling the fuel gas in the in-vehicle fuel gas container, control to prevent detection of the fuel gas by the fuel gas detector is performed.

7 Claims, 4 Drawing Sheets

METHOD OF FILLING FUEL GAS

CROSS-REFERENCE TO RELATED APPLICATION

This application is based upon and claims the benefit of priority from Japanese Patent Application No. 2019-010927 filed on Jan. 25, 2019, the contents of which are incorporated herein by reference.

BACKGROUND OF THE INVENTION

Field of the Invention

The present invention relates to a method of filling a fuel gas in an in-vehicle fuel gas container mounted in a vehicle.

Description of the Related Art

A fuel cell vehicle is a vehicle equipped with a fuel cell and a motor. The motor is operated consuming electrical energy generated in power generation of the fuel cell. The motor applies a rotational driving force to wheels of the fuel cell vehicle. As a result, the fuel cell vehicle can travel. In this regard, the fuel cell vehicle is equipped with a fuel gas container, and a fuel gas (e.g., a hydrogen gas) which has been compressed is stored in the fuel gas container. The fuel cell performs power generation by electrochemical reactions partially consuming hydrogen in the fuel gas supplied from the fuel gas container and an oxygen-containing gas in the atmospheric air.

In recent years, it has been common to adopt a fuel gas container including an inner layer comprising a liner made of resin, and an outer layer as a reinforcement layer covering the inner layer. In particular, since the diameter of hydrogen molecules is relatively small, though the quantity is small, hydrogen may permeate through the inner layer. As described in Japanese Laid-Open Patent Publication No. 2009-243675, the hydrogen gas which permeated through the inner layer (hereinafter also referred to as the "permeated hydrogen gas") enters the space between the inner layer and the outer layer. In the technique described in Japanese Laid-Open Patent Publication No. 2009-243675, when it is detected that compression stress is generated in the inner layer, a relief valve is opened to discharge this permeated hydrogen gas to the outside of the outer layer through a leak path as a discharge channel, i.e., to the atmospheric chamber through a container chamber. The phenomenon where the permeated hydrogen gas is discharged in this manner is sometimes called "burping".

SUMMARY OF THE INVENTION

A container chamber is provided with a hydrogen gas detector. When a hydrogen gas is leaked from a fuel gas container, the hydrogen gas detector detects the leaked hydrogen gas. When the hydrogen gas detector detects the leaked hydrogen gas, supply (discharge) of the hydrogen gas from the hydrogen gas container to the fuel cell, and supply (filling) of the hydrogen gas from a hydrogen gas supply source to the hydrogen gas container are stopped.

As described above, the permeated hydrogen gas is very small in quantity, and can be released into the atmospheric air without causing significant troubles. Therefore, inherently, there is no need to detect the permeated hydrogen gas in the container chamber. However, it is difficult to separate the permeated hydrogen gas and leaked hydrogen gas from each other in the container chamber. Moreover, it is difficult to detect the permeated hydrogen gas and the leaked hydrogen gas separately by the hydrogen gas detector. Therefore, for example, in the middle of filling the hydrogen gas in the hydrogen gas container, when the hydrogen gas detector detects the permeated hydrogen gas discharged from the hydrogen gas container into the container chamber even though there is no leaked fuel hydrogen gas, there is a concern that supply of the hydrogen gas from the hydrogen gas supply source to the hydrogen gas chamber is stopped, and thus, operation of the vehicle cannot be started.

A main object of the present invention is to provide a method of filling a fuel gas in which, even if a fuel gas which has permeated through an inner layer of a fuel gas container is discharged into a container chamber, it is possible to avoid interruption of filling the fuel gas into the fuel gas container.

Another object of the present invention is to provide a method of filling a fuel gas which can eliminate the concern that it becomes impossible to start operation of the vehicle.

In order to avoid the above object, according to an embodiment of the present invention, a method of filling a fuel gas in an in-vehicle fuel gas container is provided. The in-vehicle fuel gas container includes a hollow internal layer made of resin and an outer layer covering the inner layer, the in-vehicle fuel gas container being mounted in a vehicle. The method includes the steps of providing the vehicle with a fuel gas detector, a pressure measuring/calculating unit configured to measure fuel gas pressure in the in-vehicle fuel gas container and determining gas pressure decrease speed from the measurement result, a time measuring unit configured to measure elapsed time after the fuel gas pressure reaches a predetermined lower limit value, a burping occurrence condition determining unit configured to determine whether or not a burping occurrence condition where a fuel gas which entered a space between the inner layer and the outer layer is discharged to outside of the outer layer is satisfied, based on the gas pressure decrease speed and the elapsed time, and at time of filling the fuel gas in the in-vehicle fuel gas container, if the burping condition determining unit determines that the burping occurrence condition is satisfied, performing control to prevent detection of the fuel gas by the fuel gas detector.

In the present invention, when it is determined that a burping occurrence condition is satisfied, at the time of filling the fuel gas in the fuel gas container, control is performed to prevent detection of the fuel gas by the fuel gas detector. Accordingly, even if the fuel gas which permeated through the inner layer of the fuel gas container is discharged to the outside of the outer layer, it is possible to avoid erroneous recognition (erroneous detection) of the permeated fuel gas as the fuel gas leaked from the fuel gas container.

As a result, it is possible to avoid interruption of filling the fuel gas into the fuel gas container, and the subsequent interruption of starting operation of the vehicle. After all, in this case, even if the fuel gas which permeated through the inner layer of the fuel gas container is discharged to the outside of the outer layer, it is possible to eliminate the concern that the presence of the fuel gas may interrupt filling of the fuel gas into the fuel gas container and/or hinder starting operation the vehicle.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a method of filling a fuel gas according to the present invention will be described in detail in relation to a fuel cell vehicle for carrying out the embodiment, with reference to the accompanying drawings. In the embodiment, as an example, a hydrogen gas is used as a fuel gas.

Figure 1:
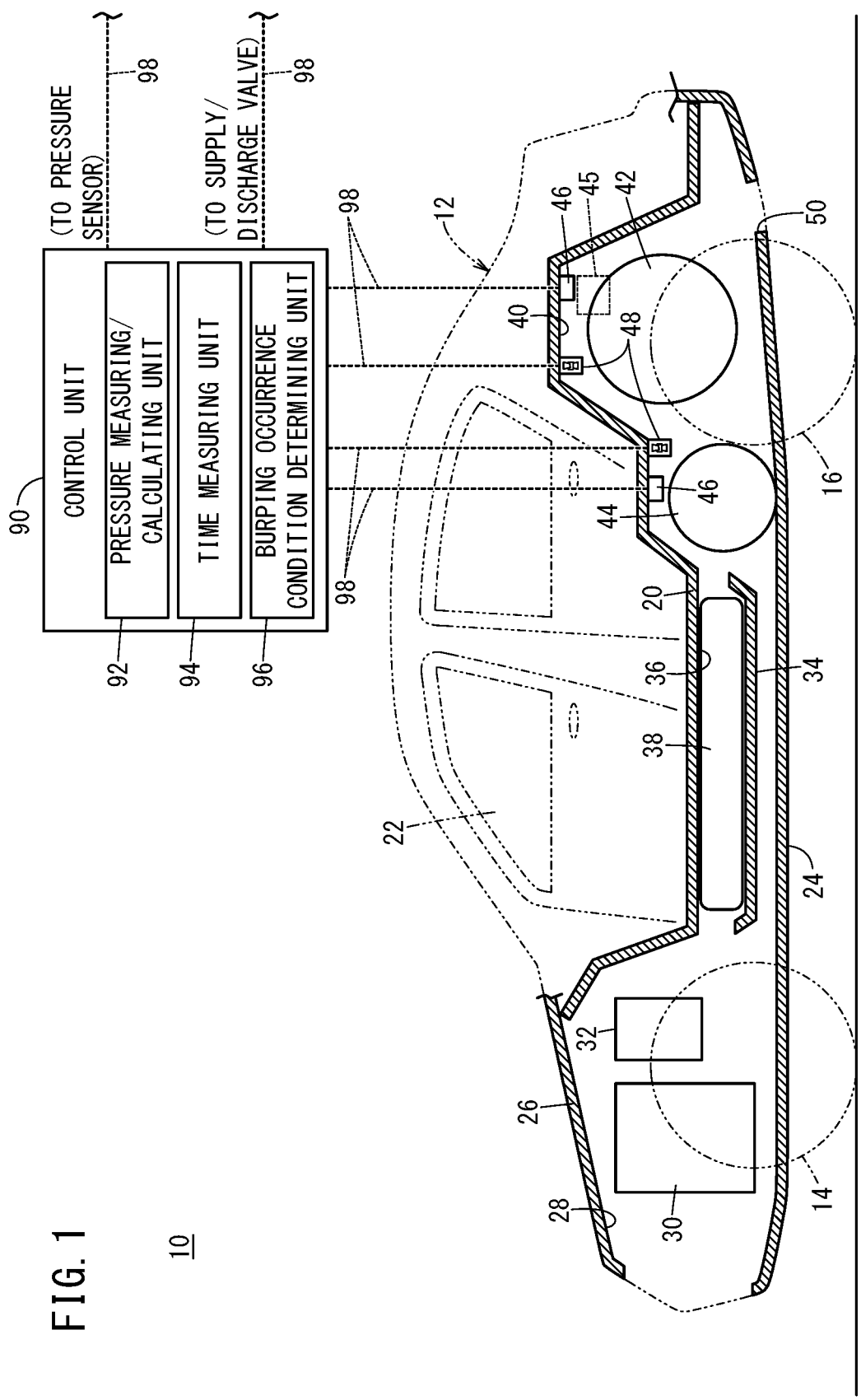
FIG. 1 is a side view schematically showing a fuel cell vehicle equipped with a fuel cell stack and a hydrogen gas container (fuel gas container)

FIG. 1 is a side view schematically showing a fuel cell vehicle (hereinafter also simply referred to as the "vehicle") 10. This vehicle 10 is a four-wheel vehicle including a vehicle body 12 and two front wheels 14 and two rear wheels 16 as travel wheels assembled to the vehicle body 12.

A floor panel 20 is provided for the vehicle body 12. The floor panel 20 is inclined upward on the front side of the vehicle body 12, and includes a recessed space which is depressed upward on the rear side of the vehicle body 12.

Further, the vehicle body 12 has a flat part at its substantially intermediate position in a longitudinal direction. The flat part defines a passenger compartment 22. A driver's seat is provided on the front right side, and a passenger's seat is provided on the front left side, of the passenger compartment 22. Rear passenger seats are provided on the rear side of the passenger compartment 22.

A motor chamber 28 is formed on the front side of the vehicle body 12, by an under cover 24, the front side of the floor panel 20, and a bonnet 26. A motor 30 and a fuel cell stack 32 (fuel cell) are stored in the motor chamber 28. The fuel cell stack 32 can perform power generation, and functions as a power supply source for driving the motor 30.

The under cover 24 is provided below the floor panel 20. The under cover 24 extends from the front end to the rear end of the vehicle body 12. The floor panel 20 and the under cover 24 is spaced from each other by a predetermined distance. In the structure, space is formed between the floor panel 20 and the under cover 24. Further, a holder panel 34 is provided below the passenger compartment 22, between the under cover 24 and the floor panel 20. The space between the holder panel 34 and the floor panel 20 is a battery chamber 36. The battery chamber 36 contains a high voltage battery 38 for supplying electrical energy to electrical equipment.

Further, a container chamber 40 is formed adjacent to (in front of, and above) the rear wheels 16 by the recessed space of the under cover 24 and the floor panel 20. The container chamber 40 contains a first hydrogen gas container 42 and a second hydrogen gas container 44 (both of the first hydrogen gas container 42 and the second hydrogen gas container 44 are in-vehicle fuel gas containers), and a hydrogen gas supplied to the fuel cell stack 32 is compressed, and stored in the first hydrogen gas container 42 and the second hydrogen gas container 44. The second hydrogen gas container 44 is a spare container. The diameter and the length of the second hydrogen gas container 44 are smaller than the diameter and the length of the first hydrogen gas container 42. That is, the volume of the second hydrogen gas container 44 is smaller than the volume of the first hydrogen gas container 42.

The vehicle body 12 is provided with a lid 45 at a position on the outer side of the container chamber 40. The lid 45 is openable and closable. A chamber inside the lid 45 is provided with a relay tube (not shown) connected selectively to a supply/discharge pipe 76 described later provided for the first hydrogen gas container 42 or the second hydrogen gas container 44. At the time of filling the first hydrogen gas container 42 or the second hydrogen gas container 44, the user connects a supply pipe of a hydrogen gas supply source to the relay pipe.

Clearance is formed between the first hydrogen gas container 42 and the ceiling surface of the floor panel 20, and between the second hydrogen gas container 44 and the ceiling surface of the floor panel 20. Hydrogen gas sensors 46 (fuel gas detectors) are provided at positions of the ceiling surface of the floor panel 20 adjacent to the first hydrogen gas container 42 and the second hydrogen gas container 44, respectively. On the ceiling surface of the floor panel 20, ventilating fans 48 as ventilators are provided adjacent to the first hydrogen gas container 42 and the second hydrogen gas container 44, respectively. On the other hand, at the portion of the under cover 24 which serves as a bottom wall of the container chamber 40, a discharge hole 50 is formed.

Figure 2:
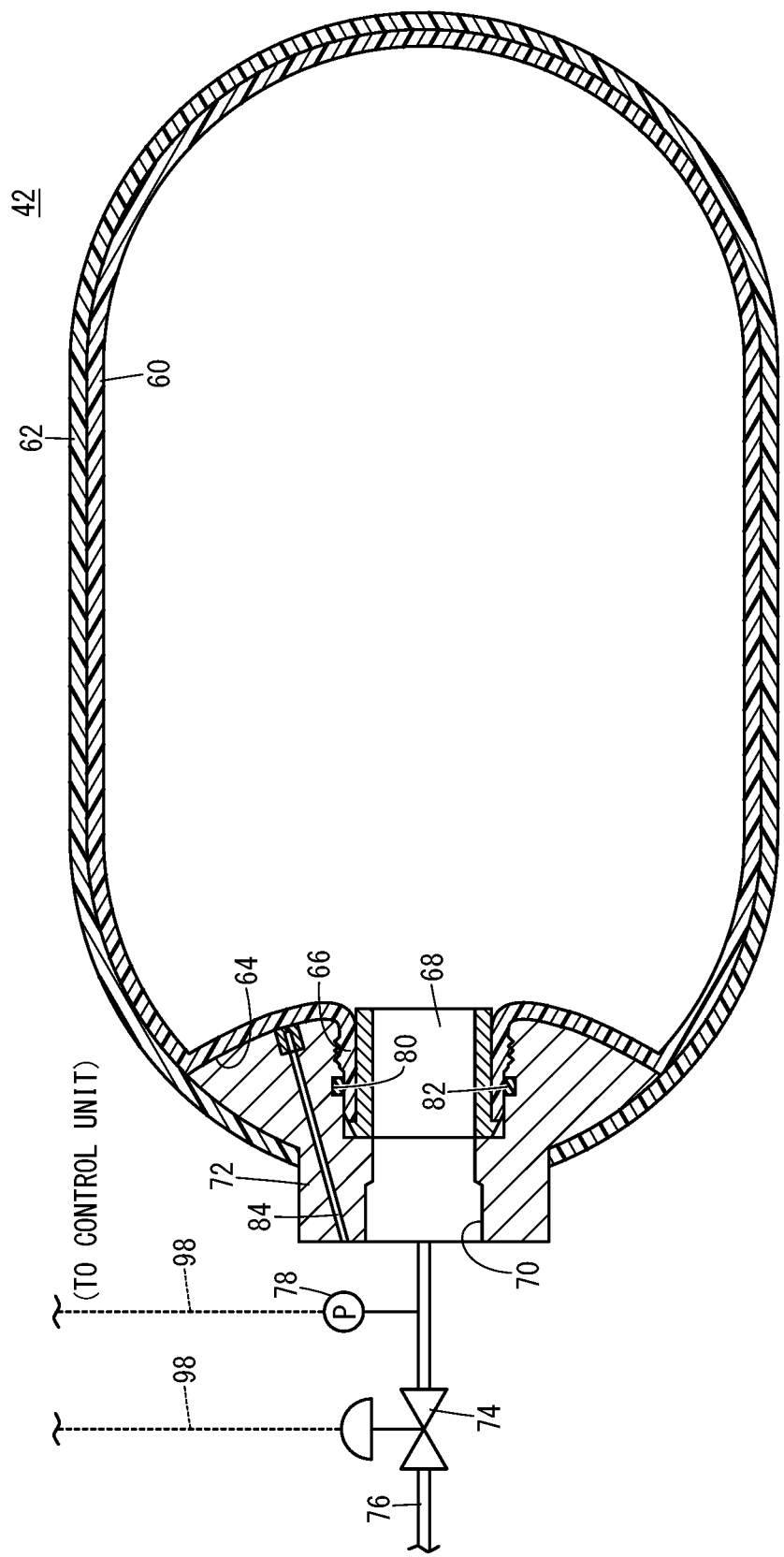
FIG. 2 is an overall schematic cross sectional view taken along an axial direction of a hydrogen gas container.

FIG. 2 is an overall schematic cross sectional view taken along an axial direction (vehicle width direction) of the first hydrogen gas container 42. The first hydrogen gas container 42 includes a hollow liner 60 (inner layer) made of resin such as high density polyethylene resin, and a reinforcement layer 62 (outer layer) made of fiber reinforced resin, etc., and covering outer part of the liner 60. An annular recess 64 is formed at an opening side end of the liner 60. A cylindrical portion 66 protrudes from a central position of the bottom surface of the annular recess 64. A collar 68 is fitted into the cylindrical portion 66. The collar 68 includes a flange having a large diameter. The flange is exposed from the cylindrical portion 66.

Further, a base 72 is attached to the annular recess 64 of the liner 60. The base 72 is made of metal, and a supply/discharge hole 70 extending in an axial direction of the liner 60 is formed in the base 72. One end of the base 72 contacts the bottom surface of the annular recess 64 and the flange of the collar 68. The other end of the base 72 is exposed from the reinforcement layer 62. The exposed other end is utilized as a joint for connecting the supply/discharge pipe 76 through a supply/discharge valve 74. A pressure sensor 78 is provided at the supply/discharge pipe 76 for measuring the hydrogen gas pressure in the liner 60.

An annular groove 80 is formed in an inner wall of the supply/discharge hole 70, and an O-ring 82 as a seal member is disposed inside the annular groove 80. That is, the O-ring 82 is interposed between the cylindrical portion 66 and the base 72. Further, a discharge channel 84 is formed in the base 72. One end of the discharge channel 84 is opened adjacent to the annular recess 64, and the other end of the discharge channel 84 is opened adjacent to an end surface of the base 72.

The second hydrogen gas container 44 has the same structure as the first hydrogen gas container 42. Therefore, illustration and description of the second hydrogen gas container 44 are omitted.

As shown in FIG. 1, a control unit 90 is provided for the vehicle 10. The control unit 90 includes a pressure measuring/calculating unit 92, a time measuring unit 94, and a burping occurrence condition determining unit 96. Further, the control unit 90 is electrically connected to the hydrogen gas sensor 46, the ventilating fan 48, the supply/discharge valve 74, and the pressure sensor 78, etc. through signal lines 98.

Hydrogen gas pressure detected by the pressure sensor 78 is transmitted to the pressure measuring/calculating unit 92. When the hydrogen gas is partially consumed and the hydrogen gas pressure in the liner 60 is decreased over time, e.g., during traveling of the vehicle 10, the pressure measuring/calculating unit 92 calculates the change speed of the hydrogen gas pressure, i.e., the gas pressure decrease speed.

Further, the time measuring unit 94 measures elapsed time after the hydrogen gas pressure is decreased to a predetermined lower limit value as a result of partial consumption of the hydrogen gas in the liner 60 (hereinafter also referred to as the "soak time"). For example, the predetermined lower limit value is set to several MPa. Additionally, the time measuring unit 94 measures travel time of the vehicle 10. For example, the travel time is a period of time from the start of power generation of the fuel cell stack 32 to the stop of power generation of the fuel cell stack 32.

As described later, the hydrogen gas in the liner 60 permeates through the liner 60, and enters the space between the liner 60 and the reinforcement layer 62. The hydrogen gas is referred to as the permeated hydrogen gas. When the burping occurrence conditions is satisfied, at the time of filling a fresh hydrogen gas into the liner 60, the permeated hydrogen gas is discharged from the end surface of the base 72 into the container chamber 40 through the discharge channel 84 (see FIG. 2). That is, burping at the time of filling the hydrogen gas occurs when the burp generation condition is satisfied.

Figure 3:
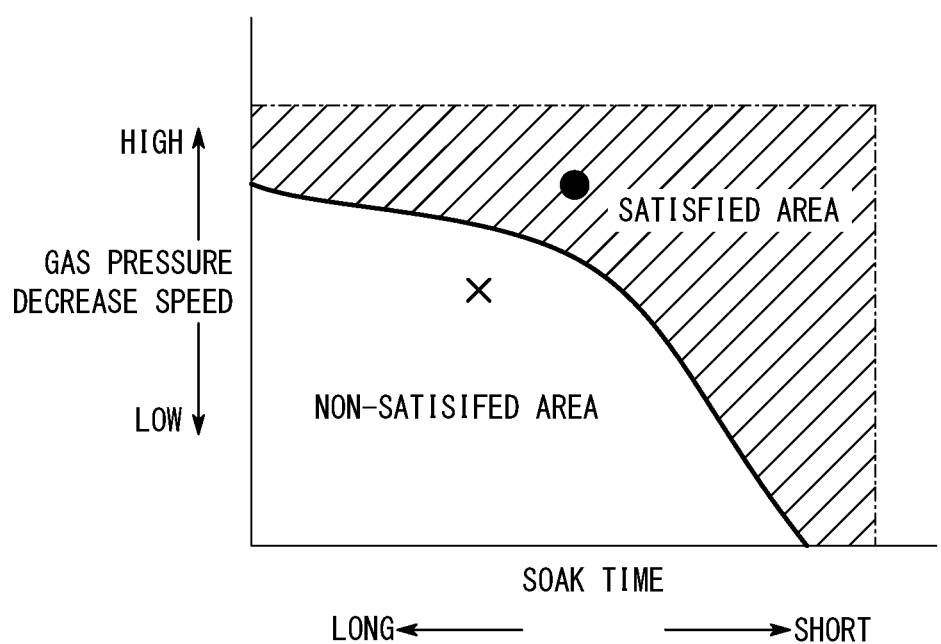
FIG. 3 is a graph schematically showing a map stored in a control unit in FIG. 1.

The inventor of the present application obtained the finding, through earnest investigation, that burping at the time of filling the hydrogen gas occurs depending on the gas pressure decrease speed and/or the soak time. Specifically, as the gas pressure decrease speed becomes higher in a case the vehicle 10 has traveled for a predetermined time, or as the soak time becomes shorter (the elapsed time after the hydrogen gas in the liner 60 reaches a predetermined low pressure becomes shorter), burping tends to occur easily. In this regard, a map shown in FIG. 3 is stored in the burping occurrence condition determining unit 96. The hatched area in the map indicating that "occurrence condition is satisfied" is a satisfied area where the burping occurrence condition is satisfied, and the remaining area is a non-satisfied area where the burp generation condition is not satisfied.

As described below, the burping occurrence condition determining unit 96 compares the gas pressure decrease speed determined by the pressure measuring/calculating unit 92 and the soak time determined by the time measuring unit 94 with the map. Based on this comparison, it is determined whether or not the burping occurrence condition is satisfied. As described above, the burping occurrence condition determining unit 96 determines whether or not the burping occurrence condition is satisfied based on the level of the gas pressure decrease speed in a case the vehicle 10 has traveled for a predetermined time, and the length of the soak time.

Figure 4:
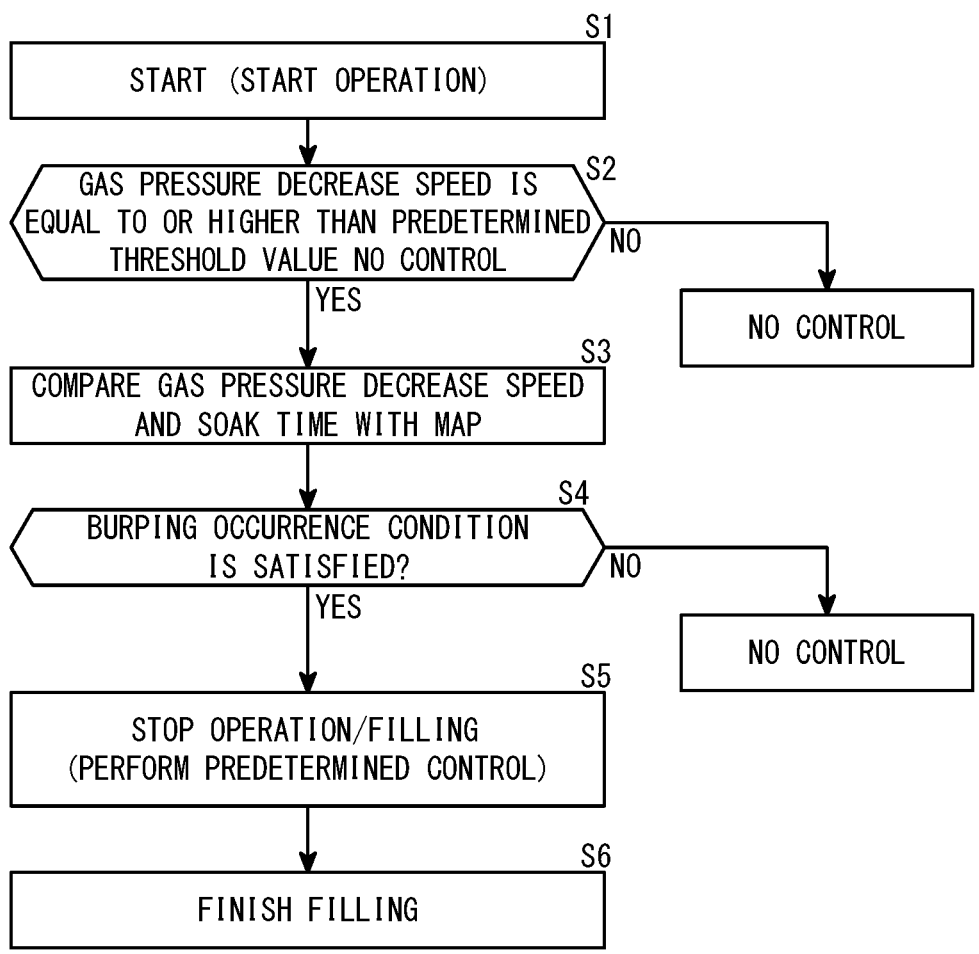
FIG. 4 is a flow chart schematically showing a method of filling a fuel gas according to an embodiment of the present invention.

Next, a method of filling the hydrogen gas according to the embodiment of the present invention will be described with reference to FIG. 4 showing the flow schematically. It is assumed that a sufficient quantity of hydrogen gas has been stored in the hydrogen gas container beforehand. Further, hereinafter, explanation will be given in connection with a case as an example, where the hydrogen gas in the first hydrogen gas container 42 is partially consumed, and the hydrogen gas is filled in the first hydrogen gas container 42.

In step S1, the user drives the fuel cell stack 32 to enable the vehicle 10 to travel. At the same time as this driving, operation of the control unit 90 is started, and the supply/discharge valve 74 (see FIG. 2) is opened. The pressure measuring/calculating unit 92 of the control unit 90 monitors the hydrogen gas pressure detected by the pressure sensor 78 all the time. Stated otherwise, the pressure measuring/calculating unit 92 measures the hydrogen gas pressure in the liner 60. Further, the time measuring unit 94 starts measurement of the travel time of the vehicle 10. Further, the control unit 90 determines the measurement value of the hydrogen gas through the hydrogen gas sensor 46.

The hydrogen gas is supplied from the first hydrogen gas container 42 to the fuel cell stack 32 through the supply/discharge pipe 76. Further an atmospheric air which has been compressed under operation of a compressor (not shown) (compressed air) is supplied to the fuel cell stack 32. In the fuel cell stack 32, electrochemical reactions of the hydrogen gas and oxygen in the compressed air are induced. As a result, the fuel cell stack 32 performs power generation.

When the motor 30 is operated as a result of power generation, the rotational driving force of the motor 30 is transmitted to the front wheels 14. As a result, the front wheels 14 are rotated to enable the vehicle 10 to travel. Also during traveling, operation of the fuel cell stack 32 is continued to operate the motor 30. That is, supply of the hydrogen gas and the compressed air to the fuel cell stack 32 is continued. Therefore, the hydrogen gas pressure in the liner 60 is decreased.

As described above, the hydrogen gas pressure in the liner 60 is recorded in the pressure measuring/calculating unit 92 through the pressure sensor 78. The pressure measuring/calculating unit 92 calculates the gas pressure decrease speed based on this measurement result and the travel time of the vehicle 10 determined by the time measuring unit 94.

In the meantime, in the first hydrogen gas container 42, the hydrogen gas permeates through the liner 60, and enters the space between the liner 60 and the reinforcement layer 62. That is, the permeated hydrogen gas is produced. The permeation speed of the hydrogen gas into resin is sufficiently slow. Therefore, the quantity of the produced permeated hydrogen gas is very small.

In step S2, traveling of the vehicle 10 is stopped, and operation of the fuel cell stack 32 is stopped. Further, the supply/discharge valve 74 is closed. If the burping occurrence condition determining unit 96 determines that the gas pressure decrease speed determined by the pressure measuring/calculating unit 92 does not reach the predetermined threshold value (NO in step S2 in FIG. 4), at the time of filling the hydrogen gas, there is no concern that the permeated hydrogen gas is discharged into the container chamber 40 through the discharge channel 84, i.e., there is no concern that burping occurs. Therefore, the subsequent steps are not performed.

In contrast, if the burping occurrence condition determining unit 96 determines that the gas pressure decrease speed reaches the predetermined threshold value ("YES" in step S2 in FIG. 4), the burping occurrence condition determining unit 96 proceeds to step S3, and compares the gas pressure decrease speed calculated as described above and the elapsed time (soak time) after the hydrogen gas pressure in the liner 60 reaches the lower limit value up to the present time with the map shown in FIG. 3. That is, the burping occurrence condition determining unit 96 plots the gas pressure decrease speed and the elapsed time on the map. If the plot is within the satisfied area as illustrated by the "black circle" in FIG. 3, the burping occurrence condition is satisfied. If the plot is within the non-satisfied area as illustrated by the "cross (X)" in FIG. 3, the burping occurrence condition is not satisfied.

When the hydrogen gas pressure in the liner 60 reaches the lower limit value, the user opens the lid 45 provided for the vehicle body 12 so as to fill the hydrogen gas in the high pressure gas container. One end of the relay tube connecting the first hydrogen gas container 42 and the hydrogen gas supply source is positioned in the chamber inside the lid 45. The user connects the supply pipe of the hydrogen gas supply source to this relay pipe. The control unit 90 which recognized this connection opens the supply/discharge valve 74.

If the burping occurrence condition is not satisfied ("NO" in step S4 in FIG. 4), there is no concern that burping occurs at the time of filling the hydrogen gas. Therefore, the control described later is not performed.

On the other hand, if the burping occurrence condition is satisfied ("YES" in step S4 in FIG. 4), at the time of filling the hydrogen, there is a concern that the permeated hydrogen gas may be discharged into the container chamber 40 through the discharge channel 84, i.e., there is a concern that burping may occur. When the permeated hydrogen gas discharged into the container chamber 40 is detected by the hydrogen gas sensor 46, the supply/discharge valve 74 is closed under operation of the control unit 90, and filling of the hydrogen gas is stopped. In order to avoid this, after operation of the vehicle 10 (power generation of the fuel cell stack 32) is stopped, in step S5 of filling the hydrogen gas, the control unit 90 performs control to prevent detection of the hydrogen gas by the hydrogen gas sensor 46.

In general, filling of the hydrogen gas into the first hydrogen gas container 42 is finished immediately after the hydrogen gas pressure in the liner 60 reaches the maximum allowable filling pressure. Therefore, the time when the hydrogen gas is filled fully (the time of reaching full filling) is defined as the time when the hydrogen gas pressure in the liner 60 reaches the maximum allowable filling pressure. It is a matter of course that the maximum filling pressure of the liner 60 is set to have a value which is lower than the withstand pressure limit of the liner 60.

Slightly before reaching full filling, a large quantity of the permeated hydrogen gas is discharged in a relatively short time. Therefore, as the first control to prevent detection of the hydrogen gas, the control unit 90 stops filling of the hydrogen gas when the pressure of the hydrogen gas reaches a predetermined pressure which is lower than the pressure of the hydrogen gas at the time of full filling (step S6). For this purpose, for example, it is adequate that the supply/discharge valve 74 is closed, or that a filling stop signal is transmitted to a station to stop supply of the hydrogen gas.

If filling of the hydrogen gas is stopped before reaching full filling, since the hydrogen gas pressure in the liner 60 is lower than the maximum allowable filling pressure, permeation of the hydrogen gas through the liner 60 is suppressed. Therefore, the permeated hydrogen gas which has entered the area between the liner 60 and the reinforcement layer 62 is not pushed out by a fresh permeated hydrogen gas, or consequently, discharged through the discharge channel 84 significantly. As a result, it is possible to avoid occurrence of burping. Accordingly, it is possible to avoid the situation where the control unit 90 erroneously determines that the permeated hydrogen gas is a leaked hydrogen gas, and the vehicle 10 cannot be restarted after filling.

Preferably, the predetermined pressure at which filling of the hydrogen gas is stopped is set to be in the range of 90 to 99% of the maximum allowable filling pressure (hydrogen gas pressure at the time of full filling). For example, assuming that the maximum filling pressure is 100 MPa, the predetermined pressure is in the range of 90 to 99 MPa. In this case, even before reaching full filling, a sufficient quantity of the hydrogen gas is stored in the first hydrogen gas container 42. Therefore, it is possible to achieve the sufficient continuous travelable distance of the vehicle 10.

Further, if leakage of the hydrogen gas occurs (if leaked hydrogen gas is produced) in the container chamber 40 for some reasons by the time the hydrogen gas in the liner 60 reaches the predetermined pressure, the leaked hydrogen gas is detected by the hydrogen gas sensor 46. That is, detection of the leaked hydrogen gas by the control unit 90 is not hindered.

Alternatively, as the second control to prevent detection of the hydrogen gas, detection of the hydrogen gas by the hydrogen gas sensor 46 may be invalidated. That is, when the control unit 90 recognizes that the hydrogen gas pressure in the liner 60 has reached the predetermined pressure which is lower than the maximum allowable filling pressure (e.g., in the range of 90 to 90% of the maximum allowable filling pressure (same as described above)), for example, the control unit 90 stops receiving/transmitting signals from/to the hydrogen gas sensor 46. Alternatively, the control unit 90 may stop operation of the hydrogen gas sensor 46.

In this case, even if the permeated hydrogen gas is discharged into the container chamber 40 through the discharge channel 84, it is possible to avoid the situation where the control unit 90 recognizes that "the permeated hydrogen gas is present in the container chamber 40". Accordingly, it is possible to avoid the situation where the vehicle 10 cannot be restarted after filling the hydrogen gas.

When predetermined time has elapsed after reaching full filling (step S6), the control unit 90 validates detection of the hydrogen gas. Since the permeated hydrogen gas in the container chamber 40 has been discharged to the atmospheric air through the discharge hole 50 beforehand, detection of the permeated hydrogen gas by the hydrogen gas sensor 46 can be avoided. Thereafter, when the hydrogen gas is leaked from the high pressure gas container into the container chamber 40 for some reasons, the leaked hydrogen gas is detected by the hydrogen gas sensor 46. As described above, also in the second control, detection of the leaked hydrogen gas by the control unit 90 is not hindered.

Alternatively, as the third control for preventing detection of the hydrogen gas, a ventilating fan 48 may be operated. That is, in the control unit 90, when the routine proceeds to step S4, or when the hydrogen gas pressure in the liner 60 reaches the predetermined pressure in or after step S4, the control unit 90 starts to rotate the ventilating fan 48. Immediately before full filling, when the permeated hydrogen gas is discharged into the container chamber 40 through the discharge channel 84, the permeated hydrogen gas is pushed by the wind generated by the ventilating fan 48, and released rapidly from the discharge hole 50 to the atmospheric air.

That is, in this case, the permeated hydrogen gas stays in the container chamber 40 only for a very short period of time. Therefore, it is possible to avoid the situation where the control unit 90 recognizes that "the permeated hydrogen gas is present in the container chamber 40". Therefore, also in the third control, it is possible to prevent the supply/discharge valve 74 from being closed under operation of the control unit 90, and prevent interruption of filling the hydrogen gas.

After the elapse of the predetermined time from full filling (step S6), the control unit 90 stops the ventilating fan 48. Since the permeated hydrogen gas in the container chamber 40 has already been released to the atmospheric air through the discharge hole 50, it is possible to avoid detection of the permeated hydrogen gas by the hydrogen gas sensor 46. Thereafter, when the hydrogen gas is leaked from the high pressure container into the container chamber 40 for some reasons, the leaked hydrogen gas is detected by the hydrogen gas sensor 46. After all, also in the third control, detection of the leaked hydrogen gas by the control unit 90 is not hindered.

In the second control and third control, since the hydrogen gas is stored in the first hydrogen gas container 42 until reaching full filling, the continuous travelable distance becomes long advantageously.

As described above, in the embodiment of the present invention, at the time of filling the hydrogen gas in the first hydrogen gas container 42, even if the permeated hydrogen gas is discharged into the container chamber 40, it is possible to avoid erroneous detection of the permeated hydrogen gas as the leaked hydrogen gas. Therefore, it is possible to avoid interruption of filling the hydrogen gas into the first hydrogen gas container 42. Further, when leakage of the hydrogen gas occur, it is possible to accurately detect the leaked hydrogen gas. The above advantages are also offered in the case of filling the hydrogen gas in the second hydrogen gas container 44.

Further, in this case, there is no need to provide a guide duct in the vehicle 10, etc. for preventing detection of the permeated hydrogen gas in the container chamber 40 by the hydrogen gas sensor 46. Therefore, it is possible to achieve cost reduction, and achieve improvement for use in general purpose applications.

The present invention is not limited especially to the above described embodiment. Various modifications can be made without departing from the gist of the present invention.

For example, the second control and the third control may be performed at the same time.

Further, the time measuring unit 94 may be divided into a travel time measuring unit and a soak time measuring unit.

Further, though the above embodiment has been described in connection with the case where the fuel gas container is used as the hydrogen gas container, and the hydrogen gas is filled in the fuel gas container as the example, a fuel gas other than the hydrogen gas may be filled in the fuel gas container. That is, the fuel gas is not limited to the hydrogen gas specially.

What is claimed is:

1. A method of filling a fuel gas in an in-vehicle fuel gas container, the in-vehicle fuel gas container comprising a hollow internal layer made of resin and an outer layer covering the inner layer, the in-vehicle fuel gas container being mounted in a vehicle, the method comprising the steps of:

providing the vehicle with:
a fuel gas detector;
a pressure measuring/calculating unit configured to measure fuel gas pressure in the in-vehicle fuel gas container and determining gas pressure decrease speed from the measurement result;
a time measuring unit configured to measure elapsed time after the fuel gas pressure reaches a predetermined lower limit value; and
a burping occurrence condition determining unit configured to determine whether or not a burping occurrence condition where a fuel gas which entered a space between the inner layer and the outer layer is discharged to outside of the outer layer is satisfied, based on the gas pressure decrease speed and the elapsed time; and
at time of filling the fuel gas in the in-vehicle fuel gas container, if the burping condition determining unit determines that the burping occurrence condition is satisfied, performing control to prevent detection of the fuel gas by the fuel gas detector.

2. The filling method according to claim 1, wherein the control to prevent the detection of the fuel gas comprises a step of, after the fuel gas pressure reaches a predetermined pressure value which is lower than the fuel gas pressure at time of full filling, invalidating detection of the fuel gas by the fuel gas detector until full filling.

3. The filling method according to claim 1, wherein the control to prevent the detection of the fuel gas comprises a step of ventilating a container chamber containing the in-vehicle fuel gas container by a ventilator.

4. The filling method according to claim 1, wherein the control to prevent the detection of the fuel gas comprises a step of, after the fuel gas pressure reaches a predetermined pressure value which is lower than the fuel gas pressure at time of full filling, invalidating detection of the fuel gas by the fuel gas detector until full filling; and
ventilating a container chamber containing the in-vehicle fuel gas container by a ventilator.

5. The filling method according to claim 1, wherein, when the gas pressure decrease speed reaches a predetermined threshold value, the burping occurrence condition determining unit determines whether or not a burping occurrence condition is satisfied.

6. The filling method according to claim 1, wherein the control to prevent the detection of the fuel gas comprises a step of stopping filling of the fuel gas at fuel gas pressure lower than fuel gas pressure at time of full filling.

7. The filling method according to claim 6, comprising a step of stopping filling of the fuel gas when the fuel gas pressure reaches 90 to 99% of the fuel gas pressure at the time of full filling.

* * * * *